(12) United States Patent
Selsam

(10) Patent No.: US 7,008,172 B2
(45) Date of Patent: Mar. 7, 2006

(54) SIDE-FURLING CO-AXIAL MULTI-ROTOR WIND TURBINE

(76) Inventor: Douglas Spriggs Selsam, 2600 Porter Ave. Unit B, Fullerton, CA (US) 92833

( * ) Notice: Subject to any disclaimer, the term of this patent is extended or adjusted under 35 U.S.C. 154(b) by 0 days.

(21) Appl. No.: 10/781,213

(22) Filed: Feb. 17, 2004

(65) Prior Publication Data

US 2004/0219018 A1    Nov. 4, 2004

Related U.S. Application Data

(63) Continuation-in-part of application No. 09/997,499, filed on Nov. 23, 2001, now Pat. No. 6,692,230, which is a continuation-in-part of application No. 09/881,511, filed on Jun. 14, 2001, now Pat. No. 6,616,402.

(51) Int. Cl.
    *F03B 15/06*     (2006.01)

(52) U.S. Cl. ................ 415/4.5; 416/198 R; 416/244 R

(58) Field of Classification Search ................ 415/4.3, 415/4.5, 908; 416/198 R, 244 R; 290/44, 290/55

See application file for complete search history.

(56) References Cited

U.S. PATENT DOCUMENTS

| | | | | |
|---|---|---|---|---|
| 628,493 A | * | 7/1899 | Smith ........................... | 19/22 |
| 628,497 A | * | 7/1899 | Smith ........................... | 416/143 |
| 893,052 A | * | 7/1908 | Carlson ........................ | 416/13 |
| 1,266,518 A | * | 5/1918 | Mulrony ...................... | 416/124 |
| 3,032,119 A | * | 5/1962 | Hachmann ............... | 416/200 R |
| 3,942,026 A | | 3/1976 | Carter | |
| 4,087,196 A | * | 5/1978 | Kronmiller .................. | 415/4.5 |
| 4,213,057 A | * | 7/1980 | Are ............................... | 290/44 |
| 4,321,005 A | * | 3/1982 | Black .......................... | 415/4.2 |
| 5,222,924 A | * | 6/1993 | Shin et al. ................... | 475/329 |
| 6,126,385 A | * | 10/2000 | Lamont ....................... | 415/4.5 |

* cited by examiner

*Primary Examiner*—Edward K. Look
*Assistant Examiner*—Igor Kershteyn

(57) ABSTRACT

A multiplicity of horizontal axis rotors are coaxially attached, at spaced intervals, to an elongate driveshaft. This driveshaft with attached rotors is aimed, not directly into the wind, but at a slightly offset angle, allowing each rotor to encounter a wind stream having fresh wind, substantially undisturbed by the wake of upwind rotors. That offset angle may be in the horizontal plane, and is maintained by a passive arrangement of components that may include a tail. In high winds the turbine is allowed to turn across the wind or furl sideways to protect it from overspeed. The space between rotors allows the turbine to be mounted atop an elevating structure wider than a normal tower. Such a wider mount may be a tripod tower, a guyed tower with guy wires attached to the tower at a point higher than the lowest point reached by the blades, or even a building.

20 Claims, 8 Drawing Sheets

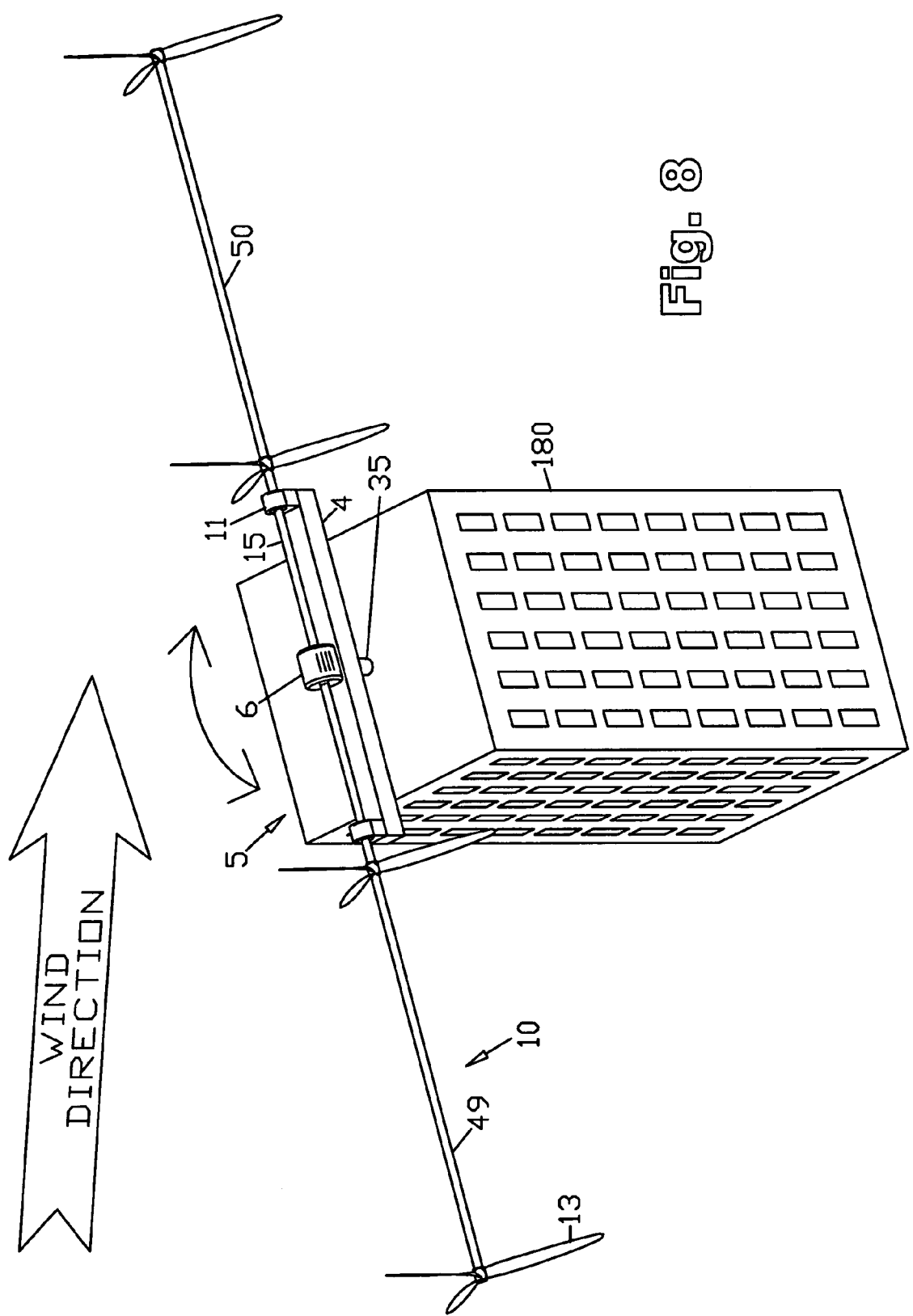

SIDE-FURLING CO-AXIAL MULTI-ROTOR WIND TURBINE (This patent application is a continuation in part of U.S. patent application Ser. No. 09/997,499 (Filing Date Nov. 23, 2001) now issued as U.S. Pat. No. 6,692,230, which is itself a continuation in part of U.S. patent application Ser. No. 09/881,511 filing date Jun. 14, 2001 issued as U.S. Pat. No. 6,616,402, and contains by reference all that is contained therein. That is to say that the present application incorporates by reference all that is included in U.S. patent application Ser. No. 09/997,499 and U.S. patent application Ser. No. 09/881,511, the entireties of which are expressly incorporated by reference herein and made a part of this specification.)

BACKGROUND

This invention relates to wind turbines.

PRIOR ART

In many embodiments of this previous application Ser. No. 09/997,499 protection from overspeed in excessively strong winds was accomplished by aligning the entire driveshaft parallel to the wind direction, reducing the offset angle alpha of the driveshaft to the wind direction to zero, so that all rotors become located within the wake of upwind rotors, except the first rotor. This method works well for overspeed protection in a normal storm where wind speeds may reach around 45 or even 50 miles per hour. The power of the wind is, however, a function of the wind speed cubed. In hurricane force winds, in the range of 60, 70 mph and higher, the upwind rotor alone, when aimed directly into the wind, may therefore still produce enough power to burn out the generator or otherwise damage the turbine. In such terrifically strong winds the downwind rotors, even within the wake of upwind rotors, may also produce enough power to contribute to damage from overspeed.

The passive sideways furling method of overspeed protection is common on small wind turbines. The turbine is mounted at a slight offset distance horizontally to one side from the azimuthal (yaw) pivot point. This makes the turbine susceptible to being blown downwind of this azimuthal pivot point in strong winds, thereby placing it sideways to the wind, so that the rotor does not face into the wind, and therefore the rotor produces reduced power, or no power at all, depending on how much it is turned away from the wind direction. Maximum protection is achieved when the rotor is oriented so that it is aimed approximately 90 degrees from the wind direction, or completely sideways. During normal operation a tail forces the turbine to remain aimed into the wind. The tail projects from the frame of the turbine by a pivot that is at an angle from vertical, with gravity acting to keep the tail fairly perpendicular to the plane of the rotor, since the weight of the tail is at its lowest point when extending perpendicular to the plane of the rotor. In strong winds however, the thrust force pushing the turbine downwind is strong enough to overcome the weight of the tail; the tail remains pointed downwind, but is lifted up by the turbine yawing downwind of its azimuthal pivot point, since the pivot it is mounted on is at an angle from vertical. A means other than gravity, such as a spring, may also be used to hold the tail perpendicular to the rotor during normal operation, as is commonly known in the prior art.

Because their blades are located so close to the tower, upwind single rotor horizontal axis turbines are known to suffer from tower strikes in strong winds, when the blades are bent back by the wind and hit the tower. If guy wires are used to stabilize the tower, they must be attached to the tower at a point below the lowest reach of the blades to avoid being struck by the blades. This fact that the blades of conventional single-rotor horizontal axis turbines are located so close to the azimuthal (yaw) pivot point also normally precludes mounting with directional freedom on a tripod type tower having a wide stance, or mounting on other wide structures such as buildings. A conventional wind turbine cannot simply be hung off the edge of a building, since to respond to wind from all directions, it must be able to rotate (yaw) to face the wind. Therefore if a conventional turbine is mounted atop a building, it needs an additional tower to elevate the turbine above the building so that the blade tips are above the level of the roof, to avoid having the blades strike the roof of the building.

BRIEF SUMMARY OF THE INVENTION

The present invention, a co-axial, multi-rotor wind turbine, incorporates passive sideways furling as a means for overspeed protection, similar to the sideways furling common on small, single-rotor turbines. As with single-rotor turbines, the multi-rotor turbine is mounted at a slight horizontally offset distance from the azimuthal (yaw) pivot point. This makes the turbine susceptible to being blown downwind of this azimuthal pivot point in strong winds, thereby placing it sideways to the wind, so that the rotors do not face into the wind, and thereby produce reduced power, or no power at all, depending on how much they are turned away from the wind direction. Maximum protection is achieved when the rotors are oriented so that they are aimed approximately 90 degrees from the wind direction, or completely sideways. During normal operation a tail forces the turbine to remain aimed almost directly into the wind, but at an offset angle alpha, to allow fresh wind to each rotor. The tail projects from the frame of the turbine by a pivot that is at an angle beta from vertical, with gravity acting to keep the tail at an angle gamma from the driveshaft, since the weight of the tail is at its lowest point within the allowed range of travel of the tail when extending at angle gamma to the direction of the driveshaft. The angle gamma is similar to, although not necessarily exactly the same as, angle alpha, the direction that the driveshaft is offset from the wind direction. The tail at angle gamma is properly oriented to maintain the frame of the turbine at such an orientation that the driveshaft is caused to remain at angle alpha from the wind direction. A means other than gravity, such as a spring, may also be used to hold the tail at angle gamma from the driveshaft during normal operation.

Since the rotors of the co-axial, multi-rotor wind turbine of the present invention are placed at spaced intervals along the driveshaft, they may be placed at some distance from the azimuthal (yaw) pivot point. This distance allows clearance from a tripod tower, or other wide mount, such as a building. If guy wires are used to stabilize a conventional tower the guy wires may be attached at any height on the tower without danger of blade strikes.

BRIEF DESCRIPTION OF THE SEVERAL VIEWS OF THE DRAWING

FIG. 8 Shows an oblique side view of a passively aimed wind turbine installation of the fourth embodiment, with the turbine mounted directly atop a building, made possible due to the inherently ample clearance of the rotors from the central pivot of this design.

PART NUMBERS IN THE DRAWING FIGURES

Figure 1:
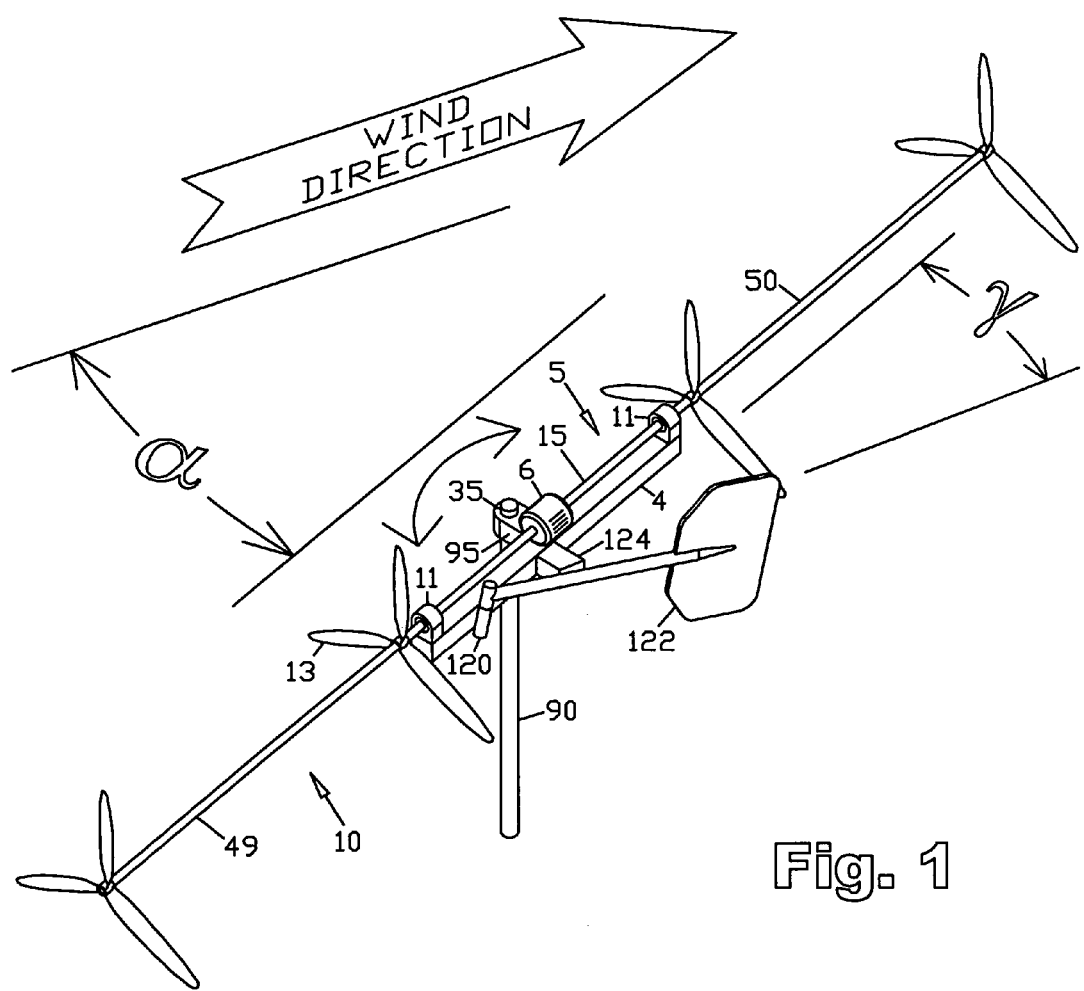
FIG. 1 Shows an oblique side view of a passively aimed wind turbine installation of the first embodiment, in its normal operating position, at an angle alpha from the wind direction, having a tail that pivots from a tail pivot, a tail stop that sets the detent offset angle gamma of the tail from the direction of the driveshaft, and offset extension means 95, which holds the driveshaft at a horizontal distance from yaw bearing 35.

4 bearing support means
5 cantilevered bearing means
6 load
10 elongate driveshaft
11 bearing
13 horizontal axis type rotor
15 axle
35 horizontally rotatable azimuthal directional orientation means (yaw bearing)
49 upwind section of the driveshaft
50 downwind section of the driveshaft
90 tower means
95 downwind offset extension means
120 tail pivot
122 tail
124 tail stop
126 resilient means to hold tail in detent position angle gamma (tail spring)
180 building
190 tripod type of tower
$\alpha$ offset angle of driveshaft from wind direction
$\beta$ offset angle of tail pivot from vertical
$\gamma$ offset angle of tail from driveshaft in horizontal plane

DETAILED DESCRIPTION OF THE INVENTION

1. First Embodiment: FIGS. 1–4

FIG. 1 shows a side-furling, horizontal-axis, co-axial multi-rotor wind turbine having a total of 4 rotors, 2 upwind and 2 downwind with the turbine in its normal operating position. A driveshaft 10 projects upwind and downwind from cantilevered bearing means 5, which comprises a bearing support means 4 and two bearings 11, with bearing support means 4 comprising an elongate structure that supports a bearing 11 toward each end. Near the center of the bearing support means is a load 6, driven by the upwind section 49 and the downwind section 50 of the driveshaft 10. The driveshaft is held with rotational freedom by the bearings.

Figure 2:
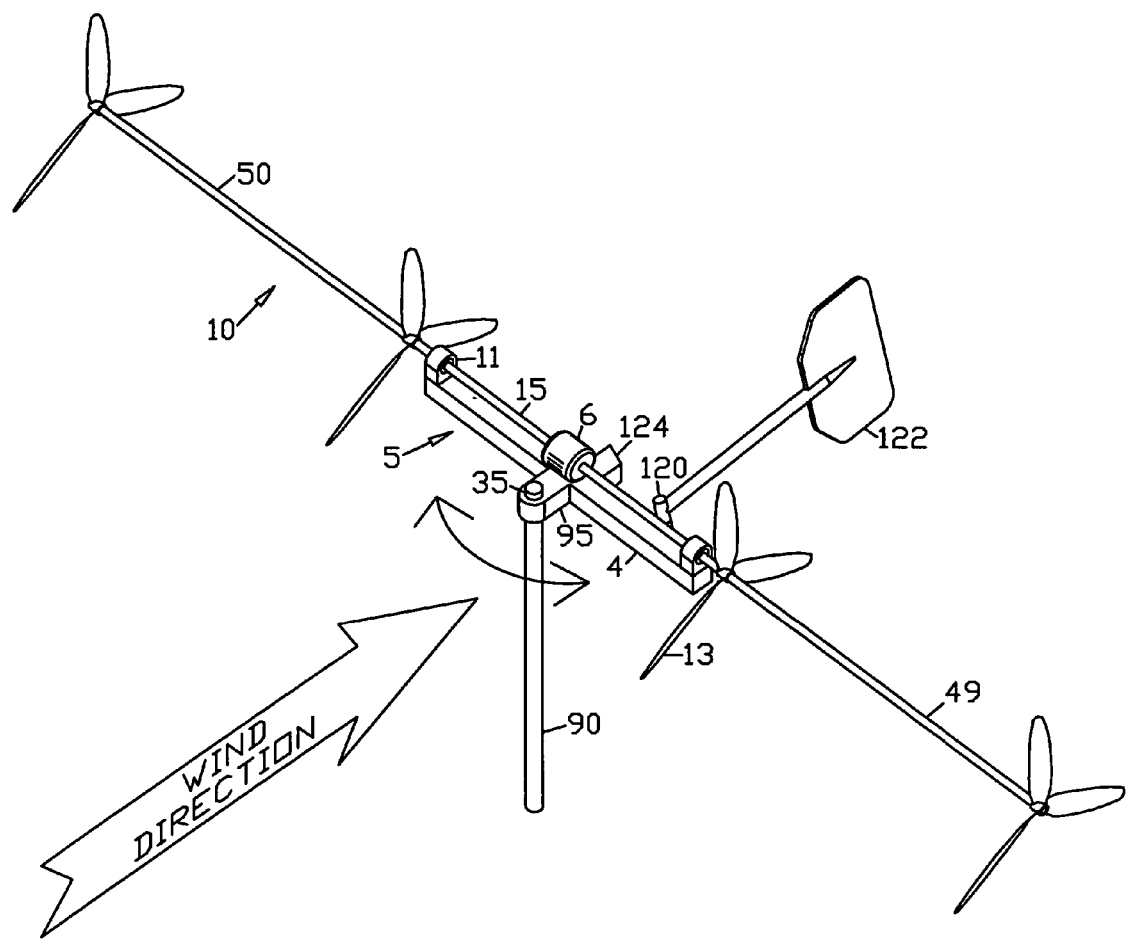
FIG. 2 Shows the turbine of the first embodiment in the furled position for protection from overspeed. The turbine has been blown downwind of the yaw bearing, and is oriented across the wind, so that power is reduced. The tail is still aimed downwind but is now nearly perpendicular to the driveshaft.
Figure 4:
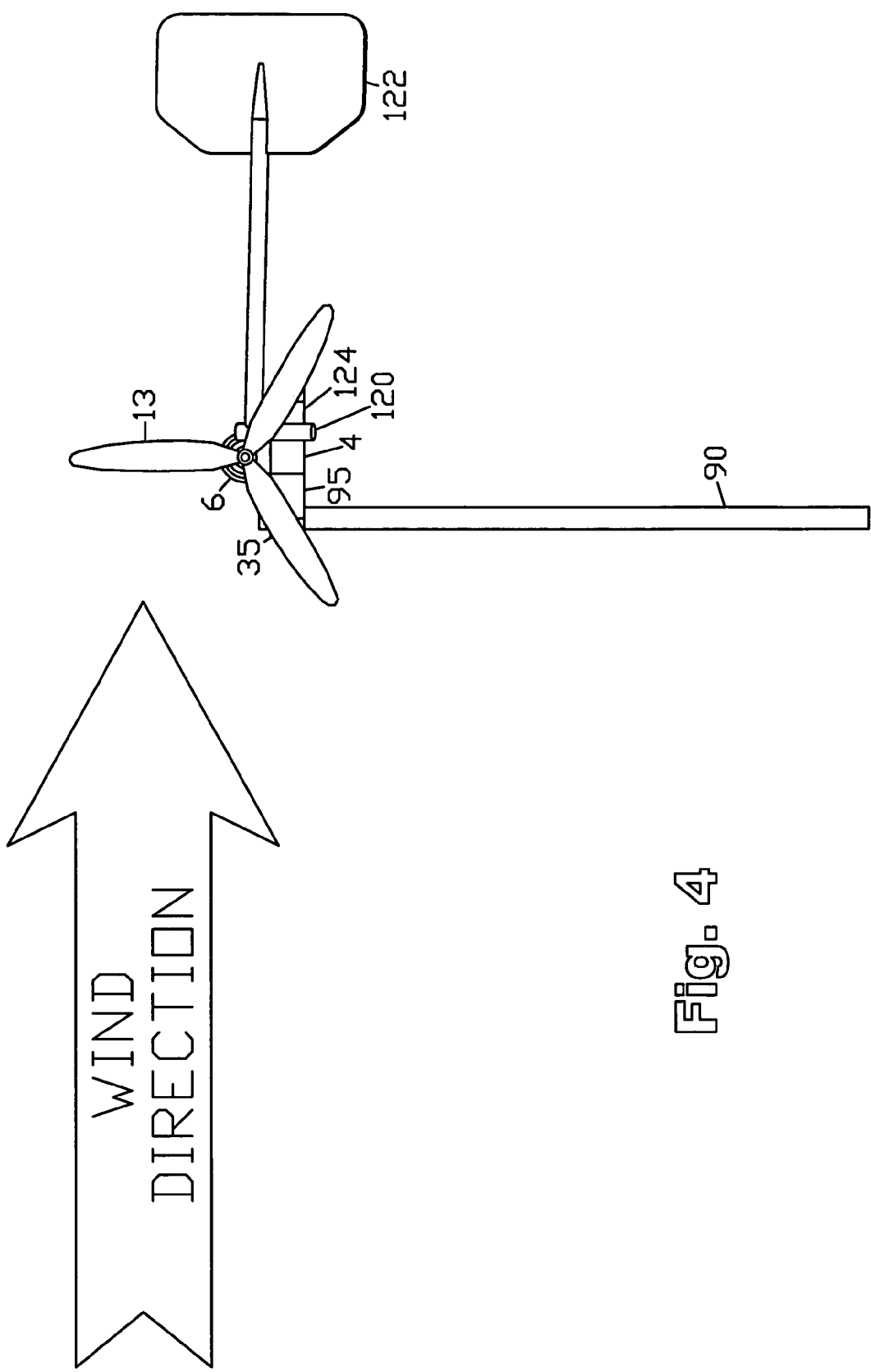
FIG. 4 Shows a side view of the turbine and tail in the sideways furling position, for protection from overspeed in excessively strong winds.

The cantilevered bearing means 5 with its projecting driveshaft 10 is supported by offset extension means 95, which holds the driveshaft at a horizontal distance from yaw bearing 35. This configuration alone, without the action of a tail, will result in the driveshaft being blown downwind of the yaw bearing, so that the driveshaft 10 with its attached rotors 13 becomes oriented perpendicular to the wind. In such a configuration the rotors, being co-axial with the driveshaft, are also perpendicular to the wind direction, and therefore produce little or no power. This configuration then, is ideal for protection from overspeed, and is illustrated in FIGS. 2 and 4.

Figure 3:
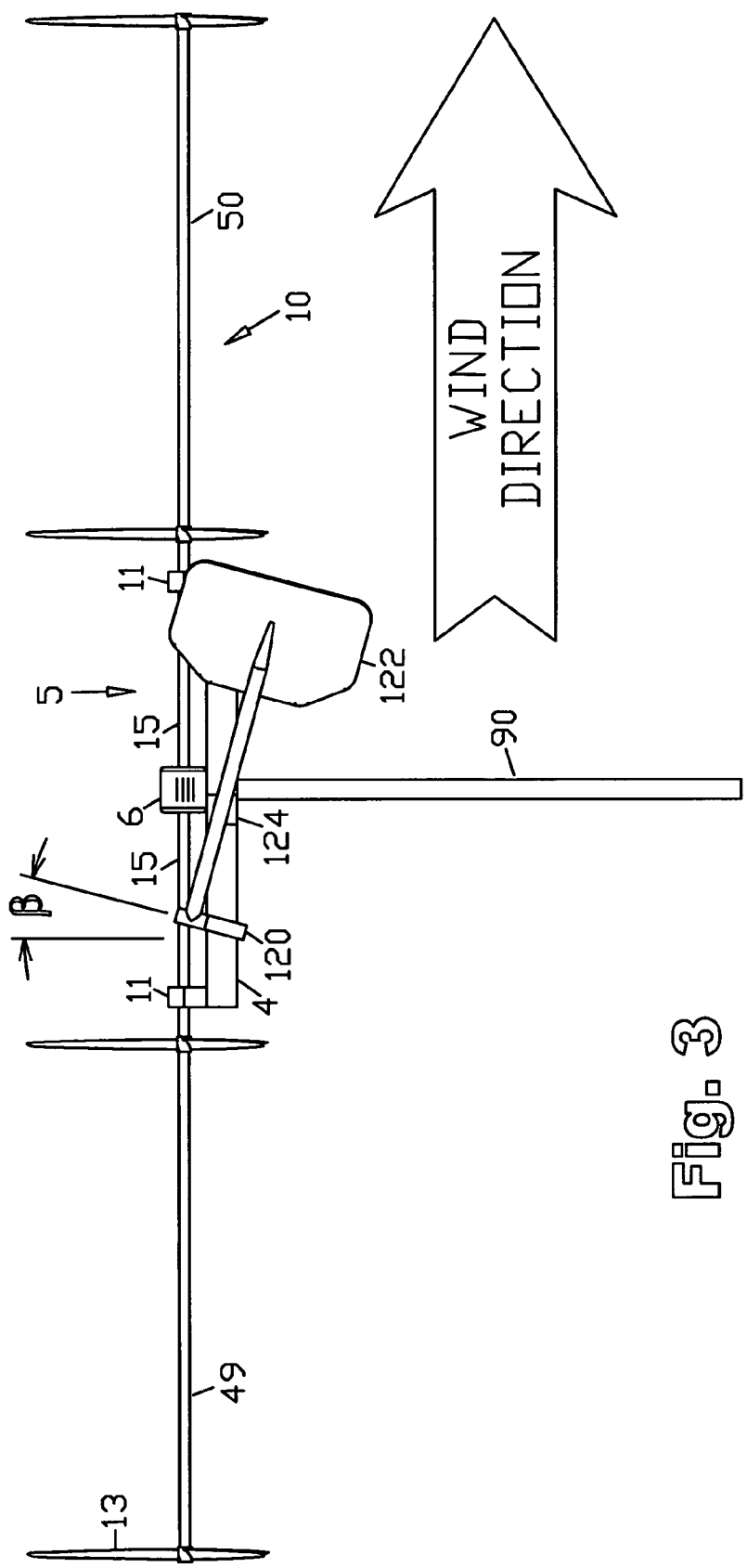
FIG. 3 Shows a side view of the turbine and tail in the normal operating position, and shows the angle beta of the tail pivot from vertical, with the tail resting in its detent position.

A tail 122 is attached to the cantilevered bearing means by tail pivot means 120. Tail pivot means 120 is tilted back generally toward the downwind section 50 at an offset angle $\beta$ from vertical as shown in FIG. 3. Due to gravity then, the tail is inclined to pivot toward the downwind section 50, but is stopped in its downward swing by a tail stop 124 which holds the tail at a detent angle $\gamma$. Angle $\gamma$ is the offset angle of tail from driveshaft in horizontal plane in the normal operating position. This angle $\gamma$ is similar to, but not necessarily exactly the same as, offset angle $\alpha$ which is the offset angle of driveshaft from wind direction. The action of the wind on the tail projecting at angle $\gamma$ is sufficient to cause a rotational (yawing) force that acts to keep the turbine headed into the wind at offset angle $\alpha$ which is the offset angle of driveshaft from wind direction. Offset angle $\alpha$, combined with the distance between rotors, allows fresh wind to reach each rotor, by placing downwind rotors largely out of the wake of upwind rotors. So in the illustration shown, the natural tendency of the turbine as a whole to be blown downwind of the yaw bearing and therefore to rotate (yaw) about the yaw bearing in a counterclockwise direction when viewed from above, so as to become aligned across the wind, is balanced by the clockwise push from the tail, which acts through inclined tail pivot 120 to rotate the turbine clockwise. The balance of these two forces results in the turbine being held at offset angle $\alpha$ from the wind direction, and at this angle $\alpha$ from the wind direction, maximum power is achieved. Note that as is known in the art, resilient means such as a spring may be used in lieu of gravity to maintain the tail in position at angle $\gamma$ during normal operation, and to allow the turbine to furl to the side at excessively high wind speeds.

At higher wind speeds, where it becomes desirable to protect the turbine from overspeed, the clockwise rotational force of the tail as directed against inclined tail pivot 120 is insufficient to overcome the natural tendency of the turbine to be blown downwind of the yaw bearing. At this wind speed the turbine is blown downwind of the yaw bearing, becoming oriented across the wind, reducing the power produced by the rotors, thereby protecting the turbine from overspeed. The speed at which this begins to take place can be adjusted by adjusting the length of the tail, the area of the tail, the offset angle β from vertical of the tail pivot, the distance that offset extension means 95 places the driveshaft from the yaw bearing, and the weight of the tail. For instance a heavier tail will cause the turbine to remain aimed into the wind at angle α at higher speeds, so that protection from overspeed, or sideways furling, takes place at a higher windspeed. Increasing the distance that offset extension means 95 places the driveshaft from the yaw bearing will tend to make it easier for the turbine to be blown downwind from the yaw bearing, lowering the wind speed at which sideways furling takes place. This type of configuration and behavior is generally known in the prior art of single-rotor small wind turbines, except that in the prior art the detent position for normal operation is for the tail to be blown perpendicular to the plane of the rotor, and for the driveshaft and rotor to therefore be aimed straight forward into the wind, whereas in the present invention, the tail is stopped in its downward swing by a tail stop 124 which holds the tail at a detent angle γ, which in turn maintains the turbine at a heading of angle α from the wind direction.

Figure 5:
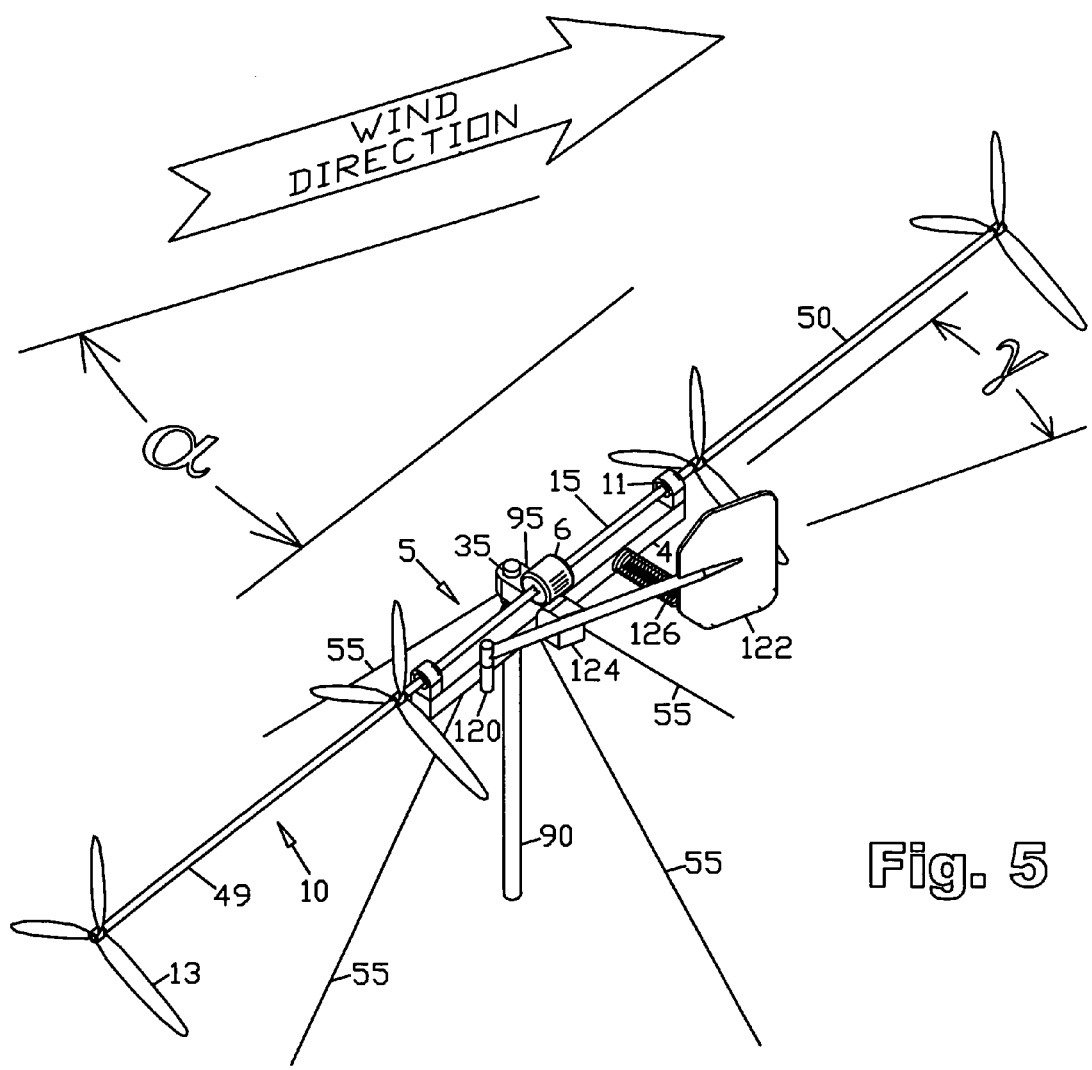
FIG. 5 Shows an oblique side view of the second embodiment, in its normal operating position, wherein the tail pivot is vertical, therefore the tail is level, and the tail is maintained in its position by a resilient means, such as a spring, instead of by gravity. The turbine is mounted atop a tower stabilized by guy wires which reach up higher on the tower than the lowest point swept by the blades, made possible due to the inherently ample clearance of the rotors from the tower of this design.
Figure 6:
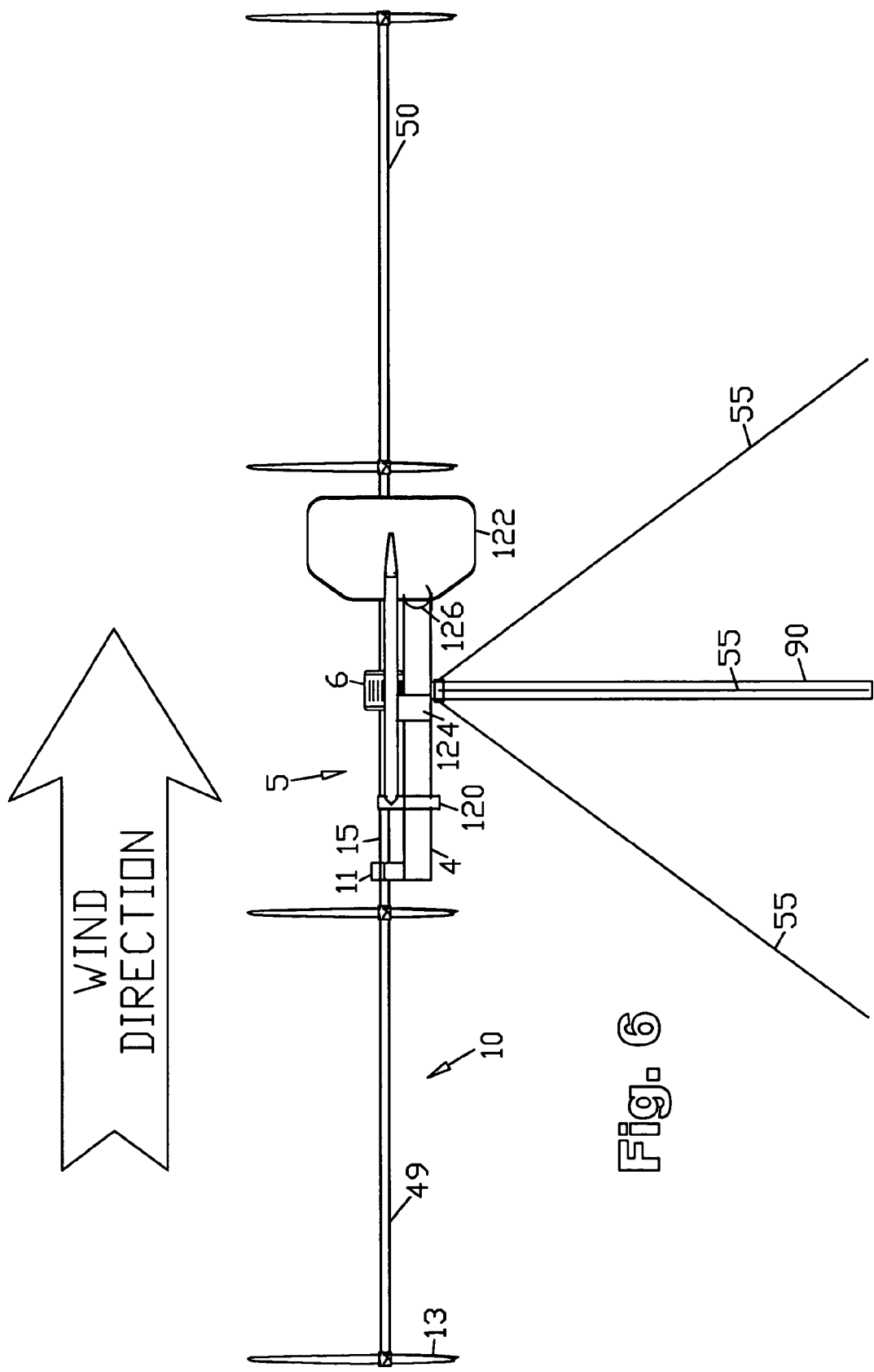
FIG. 6 Shows a side view of the second embodiment, showing the level tail extending from a vertical tail pivot, and the tower stabilized by guy wires which reach up higher on the tower than the lowest point swept by the blades, made possible due to the inherently ample clearance of the rotors from the tower of this design.

2. Second Embodiment: FIGS. 5 and 6

This second embodiment is similar to the first embodiment except a resilient means such as a spring 126 is be used in lieu of gravity to maintain the tail in position at angle γ during normal operation, and to allow the turbine to furl to the side at excessively high wind speeds. In this case, in strong winds the spring is overpowered by the force of the wind, and the turbine is blown downwind of the yaw bearing, across the wind as in the first embodiment. Also note, in this embodiment the turbine is mounted atop a guyed tower, with the guy wires 55 attached to the tower at a point higher than the lowest reach of the blades. This is an advantage over prior art single-rotor turbines mounted on guyed towers, since in that case the guy wires had to be attached at a point below the rotor blades' reach to avoid being struck by the blades.

Figure 7:
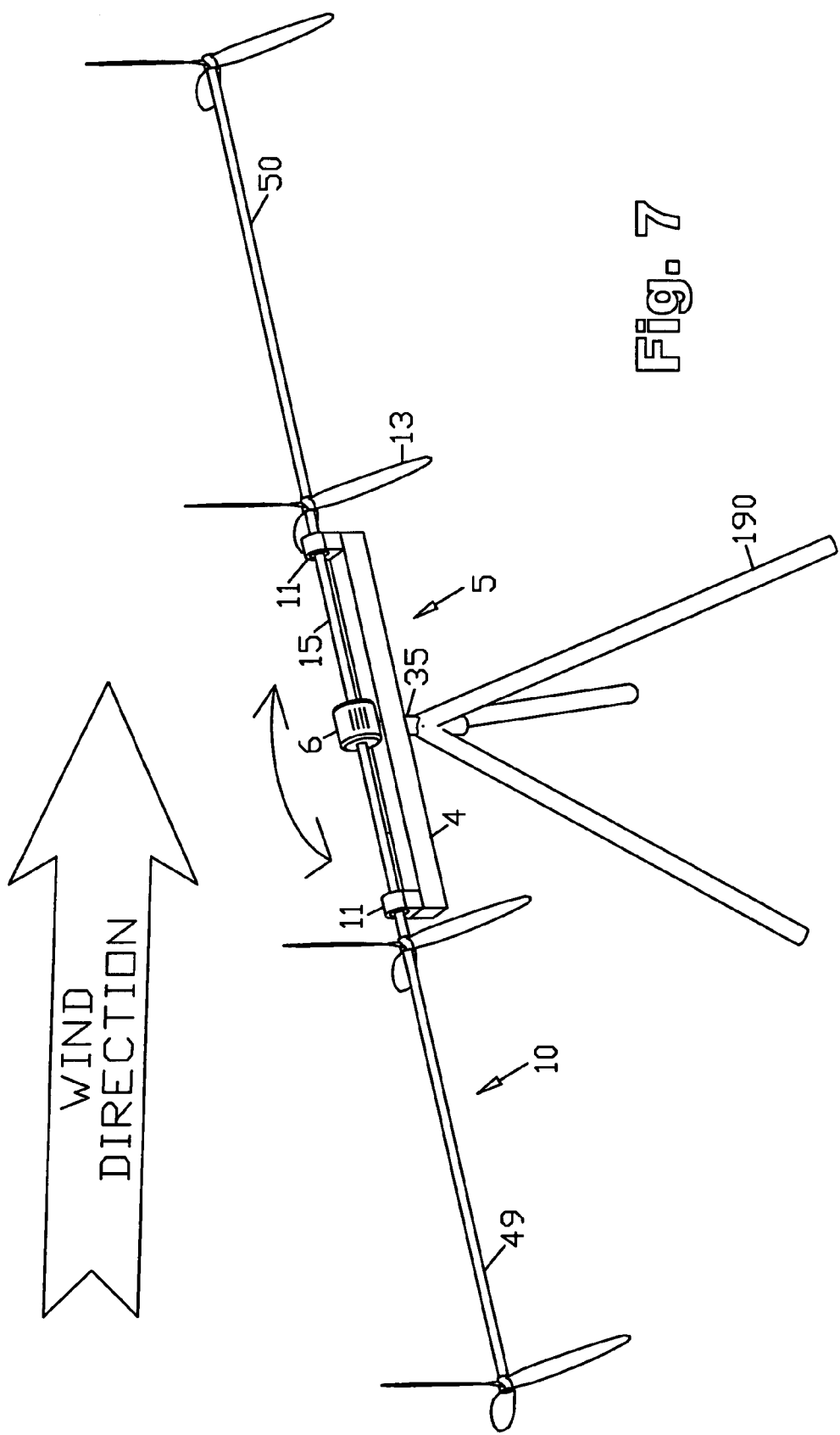
FIG. 7 Shows an oblique side view of a wind turbine installation of the third embodiment, with the turbine mounted directly atop a tripod tower having a wide stance, made possible due to the inherently ample clearance of the rotors from the tower of this design.

3. Third Embodiment: FIG. 7

The third embodiment shows a co-axial, multi-rotor turbine of the present invention mounted directly atop a tripod tower 190 having a very wide stance. No means for aiming the turbine is shown for clarity. The essential feature of this embodiment is to illustrate that this turbine can be mounted directly upon a wide elevation means such as a tripod due to the inherent large clearance of the rotors from the tower of this design. Prior art turbines could not be so mounted due to limited clearance and the likelihood of a tower strike by a blade.

4. Fourth Embodiment: FIG. 8

The fourth embodiment shows a co-axial, multi-rotor turbine of the present invention mounted directly atop a building 180. No means for aiming the turbine is shown for clarity. The essential feature of this embodiment is to illustrate that this turbine can be mounted directly upon a wide elevation means such as a building due to the inherent large clearance of the rotors from the yaw axis of this design. Prior art turbines could not be so mounted due to limited clearance and the likelihood that a blade would strike the building.

What is claimed is:

1. A co-axial, multi-rotor wind turbine having a multiplicity of rotors attached at spaced intervals to a driveshaft, with means to furl sideways to the wind to protect it from overspeed.

2. The wind turbine of claim 1 wherein said means to furl sideways comprises a yaw bearing and a horizontal offset means that supports said turbine at a distance from said yaw bearing, a tail that acts to keep the turbine headed substantially into the wind during normal operation, and means for allowing the tail to be blown to a neutral position in excessively strong winds so that the turbine may be allowed to be blown downwind of said yaw bearing and thereby become oriented across the wind, so that the rotors are oriented substantially at right angles to the wind, whereby the rotors produce a reduced amount of power, thereby protecting the turbine from overspeed.

3. The wind turbine of claim 2 wherein said tail has means for keeping said tail in a normal position during normal operation, and further having means to allow the tail to be in a neutral position in high winds, so that the turbine can be blown downwind of said yaw bearing in excessively strong winds, thereby turning the turbine across the wind to protect it from overspeed.

4. The wind turbine of claim 3 wherein said means for keeping said tail in a normal position during normal operation, and said means to allow the tail to be in a neutral position in high winds, comprise a tail pivot that is angled back from vertical, substantially toward the downwind section of the driveshaft, whereby gravity tends to pull the tail toward the downwind section of the driveshaft during normal operation.

5. The wind turbine of claim 4 wherein the travel of said tail toward said downwind section of said driveshaft is stopped by a tail stop.

6. A co-axial, multi-rotor turbine having rotors attached at spaced intervals to a driveshaft and rotating in the same direction, said spaced intervals being large enough to allow a supply of fresh wind, substantially undisturbed by upwind rotors, to reach each rotor, wherein said spaced interval is large enough to allow said turbine to be mounted atop an elevation means without contact between said rotors and said elevation means.

7. The wind turbine of claim 6 wherein said elevation means is a tower.

8. The wind turbine of claim 6 wherein said elevation means is a tripod tower.

9. The wind turbine of claim 6 wherein said elevation means is a tower having guy wires that attach near the top of the tower at a point higher than the lowest points that said rotors reach.

10. The wind turbine of claim 6 wherein said elevation means is a building.

11. The turbine of claim 6, wherein said spaced intervals are substantially equal.

12. A wind turbine, comprising:
a series of substantially horizontal axis type rotors attached in a substantially coaxial manner at spaced intervals along a driveshaft;
said driveshaft aimed sufficiently parallel to the wind for the rotors to effectively harness the wind, but at an offset angle from the wind direction, sufficient to allow an admixture of fresh air, substantially undisturbed by upwind rotors, to each rotor;
said driveshaft held in a rotationally free, cantilevered manner, by a cantilevered bearing means from which it projects;

wherein at least part of said driveshaft projects from said cantilevered bearing means substantially toward the wind;

wherein said offset angle is in the horizontal plane;

said wind turbine further comprising passive means to maintain a heading at said offset angle from the wind direction during normal operation.

13. The wind turbine of claim 1 wherein said means to furl sideways comprises a yaw bearing and a horizontal offset means that supports said turbine at a distance from said yaw bearing.

14. The wind turbine of claim 1 wherein said means to furl sideways comprises a yaw bearing and a horizontal offset means that supports said turbine at a distance from said yaw bearing, so that the turbine may be allowed to be blown downwind of said yaw bearing and thereby become oriented across the wind, so that the rotors are oriented substantially at right angles to the wind, whereby the rotors produce a reduced amount of power, thereby protecting the turbine from overspeed.

15. The wind turbine of claim 12 wherein said passive means to maintain a heading at said offset angle comprises a yaw bearing and a horizontal offset means that supports said turbine at a distance from said yaw bearing.

16. A method
for mounting a plurality of horizontal axis wind turbine rotors on a building having a top surface;
for providing freedom for each of said rotors to rotate on its own axis;
for providing directional freedom to collectively aim said rotors in any direction in response to the wind,
for mechanically coupling, in a manifold fashion, all said rotors to drive one load,
for preventing strikes of the building by the blades of said rotors,
and for providing fresh wind to each rotor, substantially undisturbed by upwind rotors, so that all rotors contribute power to drive the load,
comprising the following steps:
providing a yaw bearing means proximate said top surface of said building;
providing a bearing support means mounted on said yaw bearing means;
whereby said yaw bearing means provides rotational freedom to aim said bearing support means;
providing at least one bearing mounted on said bearing support means;
providing a driveshaft mounted in said bearing;
whereby said bearing allows said driveshaft to rotate about the longitudinal axis of said driveshaft;
whereby said driveshaft may be aimed in any direction;
whereby said driveshaft has sufficient length to overhang the periphery of said top surface of said building, whatever direction said driveshaft may aim;
mounting said rotors on said driveshaft, said rotors separated by at least one spaced interval,
said interval being of sufficient magnitude to provide sufficient clearance between said rotors and said building, whereby said rotors do not strike said building, whatever direction said driveshaft may aim;
aiming said driveshaft at an offset angle alpha to the wind direction
whereby each of said rotors is so placed, in relation to the wind direction and other said rotors, to substantially avoid the wake of other said rotors, and is thereby exposed to fresh wind, substantially undisturbed by upwind rotors, so that all rotors can substantially contribute to the rotation of the driveshaft, and;
coupling a load to said driveshaft;
whereby said driveshaft drives said load.

17. The method of claim 16 wherein a portion of said rotors extends below said top surface.

18. The method of claim 16 wherein a portion of said rotors extends below a portion of said top surface.

19. The method of claim 16 wherein a portion of said rotors extends below the highest height reached by said top surface.

20. The method of claim 16, further comprising:
aiming said driveshaft across the wind in excessive winds to protect from overspeed.

* * * * *